Oct. 7, 1969  R. D. RULE ET AL  3,470,733

FLUIDIC SENSING APPARATUS

Filed Oct. 9, 1967

Inventors
Robert D. Rule
Warren C. Ness
By McCanna, Morehead & Pills
Attorneys

United States Patent Office 3,470,733
Patented Oct. 7, 1969

3,470,733
FLUIDIC SENSING APPARATUS
Robert D. Rule, Rockford, and Warren C. Ness, Skokie, Ill., assignors to Rockford Servo Corporation, Rockford, Ill., a corporation of Illinois
Filed Oct. 9, 1967, Ser. No. 673,788
Int. Cl. G01m 3/02
U.S. Cl. 73—37.5        11 Claims

ABSTRACT OF THE DISCLOSURE

A fluidic sensing apparatus in which streams of air are directed from transmitting orifices in a sensing head toward an object spaced from the head in a manner such that the several streams interact when they strike the object to produce a reversely directed geyser which is received in a sensing orifice on the head to vary the pressure at the sensing orifice.

Background of the invention

In many cases, it is impractical or impossible to use a gap-type fluidic sensing apparatus since the gap-type sensor necessitates locating a portion of the sensor at both sides of a gap and detects the presence of an object which can be fitted into the gap to intercept a fluid jet extending across the gap. The present invention is directed to a fluid sensing apparatus in which the sensor is located entirely at one side of the object to be detected.

It has heretofore been proposed to make fluidic sensing apparatus in which a sensor is located only at one side of the object and in which the sensing apparatus directs air toward the object and measures pressure variations either in the transmitting passage or in a separate sensing passage produced when an object is interposed in the air stream. However, it has been a major problem in this type of fluid sensing apparatus to produce a usable signal level with relatively low air consumption sufficient to be commercially acceptable, when the object is spaced a substantial distance from the head.

Summary of the invention

When a stream of fluid such as air strikes a generally flat surface of an object, it does not reflect from the surface in the manner of a light beam striking a mirrored surface. Instead, very little of stream splashes back and then only in random fashion while the major portion of the stream tends to spread out and flow along the surface. The fluid sensing apparatus of the present invention has a plurality of transmitting orifices arranged to direct a plurality of streams toward the surface of the object to be detected in a manner such that the several streams, after striking the object, flow along the surface of the object and interact to produce a reversely directed column of fluid, herein sometimes referred to as a "geyser" which is sensed by a sensing orifice disposed generally centrally of a transmitting orifice. The transmitting passages leading to the transmitting orifices are advantageously arranged to have relatively converging axes which converge at a point spaced from the head a distance greater than the maximum object-to-head distance to be sensed by the sensing apparatus, so that a major portion of each transmitted stream flows inwardly instead of outwardly. The ratio of signal strength to air consumption is markedly enhanced by the use of very small transmitting orifices to direct relatively high velocity streams of air at the object. The conversion of the reversely directed fluid geyser to a pressure signal is markedly increased by the use of a sensing orifice having a relatively small area.

An important object of this invention is to provide a fluidic sensing apparatus of the type wherein the sensor is located at one side of the object to be sensed and which is adapted to detect objects spaced a substantial distance from the head and produce reliable signal levels using very low air consumption per sensing head.

A more particular object of this invention is to provide a fluidic sensing apparatus in which the ratio of the signal strength in inches of water column to air consumption per head in standard cubic feet per minute is greater than 1 when the objects are a substantial distance from the head, for example, three-eighths of an inch or more.

These, together with other objects and advantages of this invention, will be better understood from the following detailed description when taken with the accompanying drawings, wherein.

Figure 3:
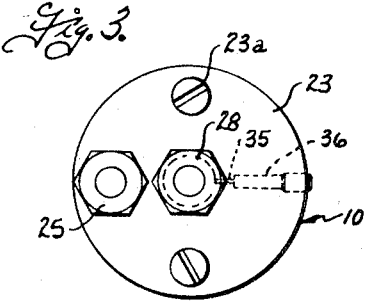
FIG. 3 is a top view of the sensing head of FIG. 1.

The fluidic sensing apparatus in general includes a sensing head 10 having means 11 for supplying fluid under pressure thereto and a fluid pressure responsive means 12, herein sometimes referred to as fluid pressure detecting means, for responding to fluid pressure variations produced in the head 10 when an object such as indicated at O is within a predetermined positional relationship to the head. The sensing apparatus is adapted for detecting a wide variety of objects and may, for example, be used for detecting relatively small objects which present a small discrete surface area or, alternatively, may be used for detecting relatively large objects or surfaces such as a continuous travelling web. The pressure detecting means 12 may be of any conventional apparatus which will respond to relatively low signal levels of the order of a few inches of water column and may, for example, be a diaphragm or a bellows-operated detecting apparatus as diagrammatically shown or a fluid amplifier device which will respond to the signal from the sensing head and produce an output signal in response thereto.

The sensing head 10 includes a plurality of transmitting passages 15 each terminating in a transmitting orifice 16 at one face f of the head for directing streams of fluid at the surface of the object O and a sensing passage 17 terminating in a sensing orifice 18 at said face f. The transmitting and sensing passages are conveniently formed by drilling openings in a solid body 21, it being understood that the transmitting and sensing passages could alternatively be formed from tubes assembled in fixed relation to each other, if desired. Fluid under pressure is supplied to one end of each of the transmitting passages 15 through a pressure distributing manifold herein shown in the form of a groove 22 in the end of the body 21, which groove communicates with the upper ends of each of the passages 15. As shown, a cover member 23 is secured to the body 21 as by fasteners 23a in overlying relation to the groove or manifold 22 and is sealed thereto as by a gasket 23b. The cap 23 has a high pressure inlet passage 24 communicating with the pressure distributing groove 22, and the pressure inlet passage is connected through a fitting 25 and conduit 26 to the fluid supply source 11. A pressure regulator 27 or the like is conveniently provided in the supply line 26, and the pressure regulator is preferably of the adjustable type to enable selective adjustment of the pressure supplied to the sensing head 10. The sensing passage 17 communicates through a fitting 28 and line 29 to the pressure detecting device 12 so as to apply the pressure signals in the sensing passage to the pressure detecting device.

A fluidic sensing apparatus to be commercially suitable for use with present fluidic detecting devices such as fluidic amplifiers, diaphragms or bellows, must be capable of producing a useful signal strength of at least one and preferably one and one-half to two inches of water column. Moreover, in many installations, it is not possible to always position the head closely adjacent the object to be detected, and it is therefore desirable to be able to detect objects which are spaced from the head a substantial distance of the order of ¼-inch, ⅜-inch and sometimes more. On the other hand, fluidic sensing apparatus are such that the air flow through the sensing apparatus is continuous when they are in operation, and it is therefore desirable and in some instances economically essential to minimize the air consumption of each sensing apparatus to a relatively low value. While the upper limit on the amount of air consumption which would be commercially acceptable will vary for different installations, a sensing apparatus which will produce a ratio of usable signal to air consumption of one or higher will find wider application and provide substantially more economical operation than a unit which utilizes many times this amount. The term "standard cubic feet of air per minute" refers to a cubic foot of air at normal room temperature and pressure, for example, a cubic foot of air at 68° F. and 14.7 p.s.i.

As previously discussed, a stream of air striking an object does not reflect from the object in the same manner as a light beam reflecting from a mirrored surface. Instead, a small portion of the stream splashes back in somewhat random fashion while the major portion of the stream tends to spread out and flow along the surface. The sensing apparatus of the present invention is arranged to utilize this phenomenon, and the transmitting passages and orifices are accordingly so arranged that portions of the streams issuing from the several transmitting orifices, after striking the object, flow inwardly toward each other and interact where they converge to produce a central geyser or reversely directed stream which extends toward the sensing orifice 18.

It has been found that the ratio of signal strength to air consumption can be markedly improved by reducing the number of transmitting passages to three substantially equally spaced transmitting passages and orifices. The following table is illustrative of measured rates of air consumption and signal strength for a conical nozzle in the form of a 45° cone having a nozzle opening of .015 inch; a six-jet nozzle having six .047 inch diameter nozzle passages inclined at an angle of 10° with respect to the sensing passage; and the same sensing head modified to close three of the six passages to produce a three-jet nozzle:

CHART I

|  | Air Consumption inches in s.c.f.m | Signal Strength in inches of W.C. at ¼" object distance | Ratio Signal Strength to Air Consumption |
| --- | --- | --- | --- |
| Conical 45° nozzle 5/16" in diameter of .015 gap | ¹ 12 | .75 | .0625 |
| 6-10° orifice .047 diameter on 9/16" circle | ² 2.2 | 1.25 | .57 |
| 3-10° orifice .047 diameter on 9/16" circle | ² 1.2 | 1.5 | 1.25 |

NOTE.—Sensing Orifice Diameter=5/16" I.D. for each nozzle test.
¹ H.P.=30 p.s.i.
² H.P.=3.0 p.s.i.

As will be seen, the conical nozzle required twelve standard cubic feet of air per minute to produce a signal strength of 0.75 inch of water column at ¼" head-to-object distance, barely a minimum usable signal. The air consumption was markedly reduced while the signal strength was simultaneously increased by using only the six-jet nozzle, and a further improvement was effected by reducing the number of jets to three. A marked decrease in the ratio of signal strength to air consumption for flat faced objects was noted when the number of jets was reduced to two. However, if the object is long and narrow, two diametrically opposed transmitting orifices will produce useful results. It is considered that a three-jet nozzle is the preferred number of jets which should be used where the diameter of the surface being detected is at least as large as the pitch circle of the transmitted jets at the point where they strike the surface of the object. However, useful results can be achieved with nozzles having a limited but somewhat higher number of jets than the minimum three-jet nozzle, and it is contemplated that four-, five- and sex-jet nozzles can be advantageously used. The ratio of signal strength in inches of water column to the air consumption in standard cubic feet per minute is indicated in the third column of the above chart and, as will be noted, increases approximately twentyfold from the ratio of .06 for the conical nozzle to 1.25 for the three-jet nozzle. It is theorized that this marked and unexpected increase in the ratio of signal strength to air consumption achieved by decreasing the number of jets to a minimum of three is due to the minimizing of the air entrainment effect. More particularly, when a gaseous fluid at a higher pressure is exhausted through an orifice to the same fluid at a lower pressure, the jet stream flowing through the orifice will expand because the molecules tend to move apart as they enter a lower pressure region and because the stream picks up or entrains molecules from the surrounding fluid and moves the entrained air along with the jet. This latter effect, that is, the entrainment of air by the high pressure streams, tends to move the surrounding air in a direction opposite the direction of the reversely directed geyser and thus opposes the geyser signal. It is considered that when an annular high pressure jet is used or even when a high number of circularly spaced jets are used, the entrainment of the surrounding air by the high pressure jets is such that it markedly reduces or weakens the geyser signal. When only a relatively small number of high pressure jets are used, the air entrainment effect is minimized, resulting in a stronger over-all signal.

The ratio of signal strength to air consumption is markedly improved by using small transmitting orifices to thereby allow use of higher transmitting pressure and consequent higher velocity jets for a given air consumption, as shown by the following Chart II:

CHART II

| | Signal strength in inches of Water Column at ¼" gap and at Air Consumption of 1.4 s.c.f.m. for each jet size —sensing orifice 5/16" I.D. |
| --- | --- |
| 3—10° orifices 0.59 in. dia. on 9/16" circle. | 1.2 (H.P.=1.3 p.s.i.). |
| 3—10° orifices .052 in. dia. on 9/16" circle. | 2.0 (H.P.=2.3 p.s.i.). |
| 3—10° orifices .031 in. dia. on 9/16" circle. | 4.6 (H.P.=18.2 p.s.i.). |

In this chart, the signal strength measured on a head having sensing orifice, of 5/16" I.D. at ¼" gap and at 1.4 s.c.f.m. are shown for three different size transmitting orifices. At these pressure levels, the flow through the orifice is generally proportional to the orifice area and also generally proportional to the square root of the pressure differential across the orifice. Therefore, as the orifice area is reduced to reduce flow, the pressure can be very markedly increased, while still maintaining the same over-all air consumption. As will be seen from the tabulation in Chart II, the signal strength for the same air consumption is substantially greater for a nozzle having three 10° orifices at .031 inch diameter than for a nozzle having three 10° orifices of .059 inch diameter. With the .059 diameter orifices, a high pressure of 1.3 p.s.i. gave an air consumption of 1.4 s.c.f.m. while with the .052 diameter orifices, a high pressure of 2.3 p.s.i. gave a signal strength of two inches of water column. The 0.31 diameter orifices are approximately one-third the area of the .052 orifices, and a high pressure of 18.2 p.s.i. (approximately nine times the pressure used in the .052 orifices) produced an air consumption of 1.4 s.c.f.m. and a signal strength of 4.6 inches of water column. It can thus be seen that the relatively smaller diameter orifices of .031 (1/32 inch) enabled use of a markedly high pressure and produced a substantially higher signal than the .052 or .059 orifices. The 1/32-ilnch diameter transmitting orifices are of a size which can be readily commercially fabricated. However, it is contemplated that relatively smaller transmitting orifices, for example, a 1/64-inch in diameter and less could be advantageously used if desired to either further increase the signal strength or decrease the air consumption.

Figure 1:
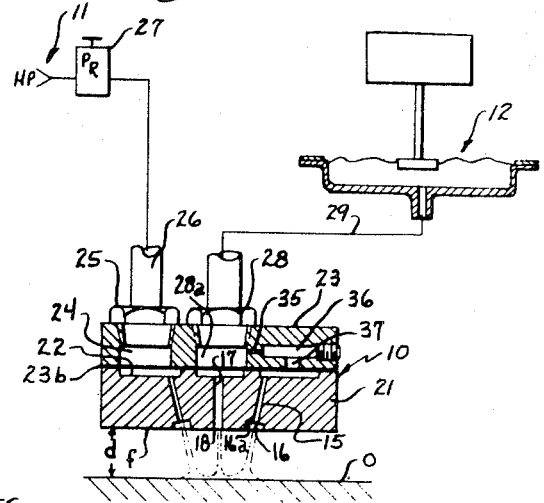
FIGURE 1 is a schematic view of a fluidic sensing apparatus embodying the present invention and showing the sensing head substantially full-size and in section taken along the plane 1—1 of FIG. 2.
Figure 2:
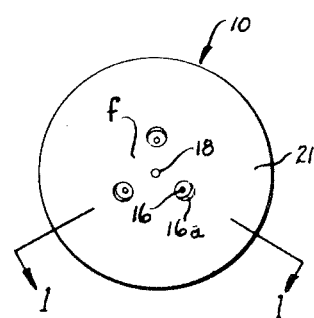
FIG. 2 is a face view of the sensing head of FIG. 1.

It is advantageous when detecting objects having flat or convex surfaces to arrange the transmitting orifices so that the axes converge relative to the central sensing orifice. It has been found preferable for objects having generally flat surfaces to incline the transmitting orifices at a relatively shallow angle of the order of 10° to 20° and preferably less than 45° with respect to the axis of the sensing orifice, so that the transmitted streams strike the object at an internal angle with respect to the surface of the object of greater than 90° whereby a greater portion of the transmitted air streams striking the object will be directed inwardly instead of outwardly. However, as the angle of convergence is increased, the component of the transmitted jets in a direction crosswise of the nozzle axes is also increased and tends to obliterate or wipe out the geyser signal. This latter effect appears to explain the decrease in signal strength which was particularly noted when the transmitting jet angle was increased from 22° to 45°. The transmitting orifices are arranged in a circle having a diameter correlated with the angle of the transmitting orifices so as to converge at a point spaced from the end face of the transmitting head a distance greater than the maximum sensing head-to-object distance to be measured. In the embodiment illustrated, with the transmitting passages 15 arranged at an angle of 10° with respect to the axis of the sensing passage 17, the orifices 16 were arranged on a circle about 9/16-inch in diameter. When the transmitting passages are inclined at a relatively higher angle, the transmitting orifices should be arranged on a relatively larger diameter circle so that the point of convergence of the axes of the transmitting orifices is always at a point spaced a distance substantially greater than the maximum sensing head-to-object distance (designated $d$ in FIG. 1) to be measured. In this regard, it is to be noted that, due to the spreading of the high pressure jets, they tend to merge at a distance somewhat closer than the point of convergence of the axes of the jets and that the radial spacing of the jets must be selected so that the expanding jets do not merge and oppose the "geyser" signal in the maximum sensing head-to-object to be encountered. As best shown in FIG. 1, the head is preferably formed so that the end face 16a around the orifices 16 is normal to the axis of the respective transmitting orifice. This can conveniently be achieved either by individual counterfaces around the transmitting orifices or by an annular inclined groove to define the aforedescribed faces which are normal to the axis of the transmitting orifice. The sensing orifice 16 terminates at the face $f$ in a plane adjacent the plane of the transmitting orifices 16.

Figure 4:
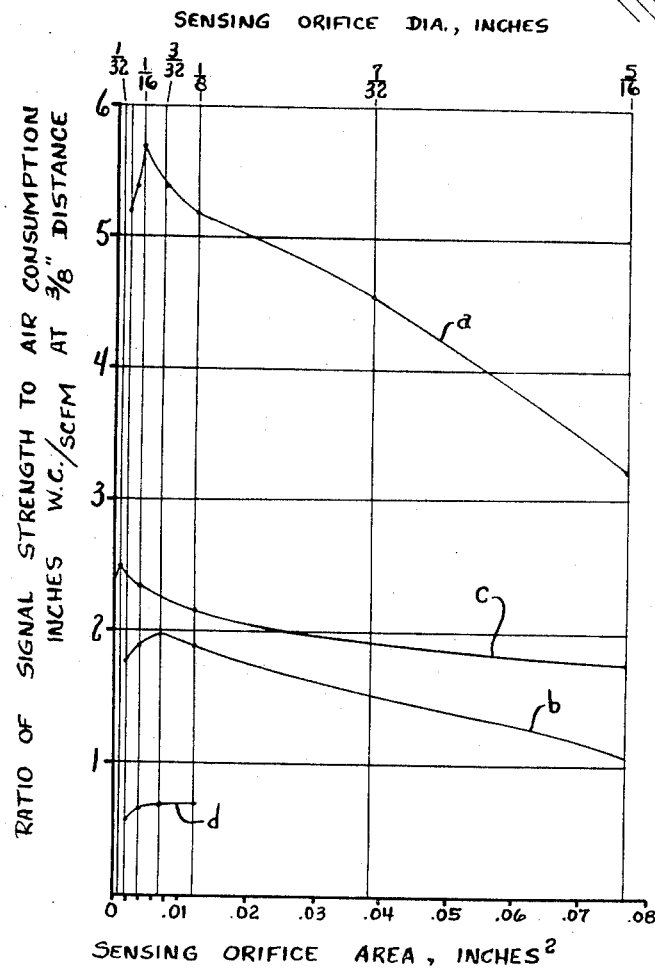
FIG. 4 is a graph illustrating variation of the ratio of signal strength to air consumption with different receiving orifice areas and with different transmitting orifice arrangements and sizes.

It has been found that marked improvement in conversion of the reversely directed geyser signal to a pressure signal in the sensing orifice can be achieved by utilizing relatively small size sensing orifices. The variation in the ratio of signal strength to aid consumption with different sensing orifice areas in square inches, is graphically shown in FIG. 4, for several different transmitting orifice sizes and configurations. Curve $a$ shows the variation in the ratio of signal strentgh to air consumption with different sensing orifice areas for a sensing head having three transmitting orifices of .031 inch diameter (1/32-inch) arranged at an angle of 10° with respect to the axis of the sensing orifice and on a circle 9/16-inch in diameter. The signal levels were measured at a sensing head-to-object distance designated $d$ in FIG. 1 of 3/8-inch, at an air pressure of 18 p.s.i. and at an air consumption of 1.4 s.c.f.m. and the ratio of signal strength to air consumption then computed by dividing the measured signals by a factor of 1.4 for graphic illustration of the ratio. As will be seen, the ratio increases from about 3.4 with a sensing orifice diameter of 5/16-inch to a maximum of about 5.7 for sensing orifice diameter of about 1/16-inch, and the signal level then falls off at lower sensing orifice diameters. Curve $b$ shows a variation of the ratio of signal strength to air consumption with different sensing orifice areas for a sensing head having three transmitting orifices of 0.59 inches in diameter arranged on a 9/16-inch circle and inclined at an angle of 10° with respect to the axis of the sensing orifice. The signal strengths were measured at an air pressure of 2.4 p.s.i. and an air consumption of 1.85 s.c.f.m. and the measured signals then divided by a factor of 1.85 for graphic illustration of the ratio. This curve shows the same effect noted in Chart II, that is, that the signal strength decreases as the transmitting orifice size is increased. However, curve $b$ shows additionally that there is a significant increase in over-all signal strength with the smaller sensing orifice areas with the maximum signal strength ratio being achieved at about 3/32-inch diameter sensing orifice.

Curve $c$ shows a variation in the ratio of signal strength to air consumption for different sensing orifice areas in a sensing head having three transmitting orifices of .031 inch in diameter arranged at an angle of 0°, and on a circle diameter of 9/16-inch. The signal strengths were measured at the same air pressure of 18 p.s.i. and air consumption of 1.4 s.c.f.m. used in curve $a$ and the measured signals then divided by a factor of 1.4 for graphic illustration of the ratio. From a comparison of curves $a$ and $c$ it will be seen that, for the same size transmitting orifices arranged on the same diameter circle, the 10° transmitting orifices give a substantially higher signal strength to air consumption ratio for each different size of sensing orifice than the corresponding 0° transmitting orifices. Curve $d$ shows the variation in the ratio signal strength to air consumption for different sensing orifice areas in a transmitting head having three transmitting orifices of .059 inch in diameter arranged at an angle of 45° to the axis of the sensing orifice and in a circle of 1 3/16 inches in diameter. The signal strengths were measured at the air pressure of 2.4 p.s.i. and air consumption of 1.85 s.c.f.m. used in curve $b$ and the measured signals then divided by a factor of 1.85 for graphic illustration of the ratio. The head utilized in the test shown in curve $d$ has the same size transmitting orifices as that used in curve $b$ and differs therefrom only in the angular and radial relationship of the transmitting orifices relative to the sensing orifices. This indicates a substantially smaller ratio signal strength to air consumption for the 45° orifices than for corresponding orifices arranged at 10°. It is considered that the optimum size sensing orifice is one which is about the same as the diameter of the high velocity core of the geyser. If the receiving orifice is substantially larger than this optimum, then the velocity head is not as efficiently converted to pressure head because there is space in the sensing orifice for a reverse flow of the geyser to occur. If the sensing orifice is very much smaller than this optimum, the velocity head of the geyser is overly restricted.

In order to prevent ingestion of foreign material into the sensing orifice and the detecting apparatus 12 associated therewith, it is advantageous to supply fluid at relatively lower pressure to the sensing orifice sufficient to cause fluid to flow out of the sensing orifice throughout the operating range of the sensing apparatus. This can conveniently be achieved by providing a flow restrictor between the high pressure line 26 and the sensing orifice to bleed a continuous substantially constant amount of air to the sensing orifice. In the embodiment illustrated, the flow restrictor designated 35 is in the form of a restricted orifice or passage formed in the sensing head. The flow restrictor communicates at one end with a chamber 28a at the upper end of the sensing passage 17 and at the other end through passages 36 and 37 with the annular high pressure manifold or distributing channel 22. Thus, air under pressure from the high pressure line is continuously fed through the flow restrictor 35 to the sensing passage 17, and the size of the orifice 35 is substantially smaller than the sensing passage 17 and such as to normally provide a relatively low pressure in the sensing passage, for example, of the order of a few inches of water column or the amount necessary to assure outbreathing from the sensing orifice even when the geyser signal is present. The detecting device 12 responds to the resultant of the relatively constant pressure fed to the sensing passage through the restrictor 35 and the variation in pressure in the sensing passage 17 produced by the geyser.

From the foregoing, it will be seen that the fluidic sensing apparatus is capable of producing usable signals greater than one to two inches of water column with very low air consumption and at substantial sensing head-to-object distances. Improved signal levels are achieved by using a small number of transmitting orifices, preferably three, having a small diameter of less than $\frac{1}{16}$-inch and preferably in the range of .005 to .04 inch. The transmitting passages are advantageously arranged to converge at a shallow angle with respect to the axis of the sensing orifice at an angle of less than 45° with best results being achieved in a range of about 10 to 20°. The conversion of the geyser signal to a useful pressure signal is most efficiently achieved by using a small sensing orifice diameter less than $\frac{5}{16}$-inch and preferably in a range of about .010 to $\frac{7}{32}$-inch.

What is claimed as new is:

1. A fluidic sensing apparatus for sensing a material against which the apparatus directs an air stream comprising a sensing head, having a plurality of circularly spaced transmitting passages terminating in individual transmitting orifices each having a diameter less than $\frac{1}{16}$-inch and arranged in a circle at one side of said head, a sensing passage terminating in a sensing orifice at said one side of the head and generally centrally of said transmitting orifices, said transmitting passages having relatively converging axes arranged to converge at a point spaced a substantial distance from said one side of said head, means communicating with said transmitting passages for supplying fluid under pressure to said transmitting passages for flow through said transmitting orifices in relatively converging streams, and detector means communicating with said sensing passage for sensing variations in pressure in said sensing passage, said relatively converging streams when striking a material disposed intermediate said one side of the head and the point of convergence of said axes interacting to produce a central geyser of fluid directed toward sensoring orifice to vary the pressure in said sensing passage.

2. A fluidic sensing apparatus according to claim 1 wherein said sensing orifice has a diameter of less than $\frac{5}{16}$-inch.

3. A fluidic sensing apparatus for sensing a material against which the apparatus directs an air stream comprising, a sensing head having a plurality of circularly spaced transmitting passages terminating in individual transmitting orifices at one side of the head, means communicating with said transmitting passages for supplying fluid under pressure thereto, a sensing passage terminating in a sensing orifice at said one side of the head and generally centrally of said transmitting orifices, detector means communicating with said sensing passage for sensing variations in pressure in said sensing passage, said transmitting passages having a diameter less than $\frac{1}{16}$-inch to direct relatively high velocity streams which are adapted upon striking an object spaced from said one side of the head to intereact and form a central geyser directed toward said sensing orifice, said sensing orifice having a diameter less than $\frac{5}{16}$-inch for receiving the geyser produced by the stream from said transmitting orifice to produce a pressure signal.

4. A fluidic sensing apparatus according to claim 3 including means for supplying fluid to said sensing orifice at a pressure substantially lower than the pressure supplied to said transmitting passages and sufficient to normally produce a low outward flow of fluid through the sensing orifice.

5. A fluidic sensing apparatus according to claim 3 wherein said sensing orifice has a diameter in the range of .010 to $\frac{7}{32}$-inch.

6. A fluidic sensing apparatus according to claim 3 wherein said transmitting orifices comprise three orifices having a diameter in the range of .005 to .04 inch.

7. A fluidic sensing apparatus according to claim 3 wherein said transmitting orifices comprise three equally spaced transmitting orifices having a diameter in the range of .005 to .04 inch and said sensing orifice has a diameter in the range of .010 to $\frac{7}{32}$-inch.

8. A fluidic sensing apparatus for sensing a material against which the apparatus directs an air stream comprising a sensing head having a plurality of circularly spaced transmitting passages terminating in individual transmitting orifices arranged in a circle at one side of said head, a sensing passage terminating in a sensing orifice at said one side of the head having a diameter less than $\frac{5}{16}$-inch and generally centrally of said transmitting orifices, said transmitting passage having relatively converging axes arranged to converge at a point spaced substantial distance from said one side of said head, means communicating with said transmitting passages for supplying fluid under pressure to said transmitting passages for flow through said transmitting orifices in relatively converging streams, and detector means communicating with said sensing passage for sensing variations in pressure in said sensing passage, said relatively converging streams when striking a material disposed intermediate said one side of the head and the point of convergence of said axes interacting to produce a central geyser of fluid directed toward said sensing orifice to vary the pressure in said sensing passage.

9. A fluidic sensing apparatus for sensing a material against which the apparatus directs an air stream comprising a sensing head having a plurality of circularly spaced transmitting passages terminating in individual transmitting orifices each having a diameter in the range of .005 to .04 inch and arranged in a circle at one side of said head, a sensing passage terminating in a sensing orifice at said one side of the head and generally centrally of said transmitting orifices, said transmitting passage having relatively converging axes arranged to converge at a point spaced a substantial distance from said one side of said head, means communicating with said transmitting passages for supplying fluid under pressure to said transmitting passages for flow through said transmitting orifices in relatively converging streams, and detector means communicating with said sensing passage for sensing variations in pressure in said sensing passage, said relatively converging streams when striking a material disposed intermediate said one side of the head and the point of convergence of said axes interacting to produce a central geyser of fluid directed toward said sensing orifice to vary the pressure in said sensing passage.

10. A fluidic sensing apparatus according to claim 9 wherein said sensing orifice has a diameter in the range of .010 to 7/32-inch.

11. A fluidic sensing apparatus according to claim 10 wherein said transmissing passages comprise at least three equally spaced transmitting passages having their axes converging at an angle of less than 45° with respect to the axis of the sensing passage.

References Cited

UNITED STATES PATENTS

| 3,213,370 | 10/1965 | MacGeorge | 73—37.6 |
| 3,371,517 | 3/1968 | Roth | 73—37.5 |

LOUIS R. PRINCE, Primary Examiner

WILLIAM A. HENRY, Assistant Examiner